(12) United States Patent
Li et al.

(10) Patent No.: US 10,795,505 B2
(45) Date of Patent: Oct. 6, 2020

(54) TOUCH DEVICE

(71) Applicants: BOE TECHNOLOGY GROUP CO., LTD., Beijing (CN); HEFEI XINGSHENG OPTOELECTRONICS TECHNOLOGY CO., LTD., Hefei, Anhui (CN)

(72) Inventors: Baoran Li, Beijing (CN); Yang Liu, Beijing (CN); Bisheng Li, Beijing (CN); Wenjin Fan, Beijing (CN); Jiawei Xu, Beijing (CN); Taofeng Xie, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 120 days.

(21) Appl. No.: 16/146,622

(22) Filed: Sep. 28, 2018

(65) Prior Publication Data
US 2019/0250729 A1    Aug. 15, 2019

(30) Foreign Application Priority Data
Feb. 9, 2018    (CN) .......................... 2018 1 0132726

(51) Int. Cl.
*G06F 3/042*    (2006.01)
*G06F 3/0354*    (2013.01)
*G06F 3/02*    (2006.01)

(52) U.S. Cl.
CPC ............ *G06F 3/042* (2013.01); *G06F 3/0202* (2013.01); *G06F 3/03547* (2013.01)

(58) Field of Classification Search
CPC ..... G06F 3/0202; G06F 3/03547; G06F 3/042
See application file for complete search history.

(56) References Cited

U.S. PATENT DOCUMENTS

| | | | | |
|---|---|---|---|---|
| 8,692,798 | B1 * | 4/2014 | Zhang | ..................... G06F 3/042 345/173 |
| 2005/0184885 | A1 * | 8/2005 | Tervonen | .............. G06F 1/1626 341/31 |
| 2008/0029691 | A1 * | 2/2008 | Han | ..................... G06F 3/04883 250/224 |
| 2008/0181706 | A1 * | 7/2008 | Jackson | ................ G06F 3/0202 400/482 |
| 2009/0315989 | A1 * | 12/2009 | Adelson | ............... A61B 5/1172 348/135 |

(Continued)

*Primary Examiner* — Amare Mengistu
*Assistant Examiner* — Crystal Mathews
(74) *Attorney, Agent, or Firm* — Kinney & Lange, P.A.

(57) ABSTRACT

A touch device is provided, which includes an elastic material layer, a photosensitive layer and a touch layer disposed in sequence; wherein a key region is disposed in the touch layer; at least one deformable pad is disposed in the elastic material layer and each of the at least one deformable pad has a plurality of deformable blocks; some or all of the deformable blocks of the deformable pad are deformed so as to vary lights incident on the photosensitive layer in response to a corresponding position of the touch layer being subjected to a pressing operation; an electrical signal at a position of the photosensitive layer corresponding to the pressing operation changes in response to the photosensitive layer sensing a change in lights.

12 Claims, 5 Drawing Sheets

(56) References Cited

U.S. PATENT DOCUMENTS

| | | | |
|---|---|---|---|
| 2011/0221707 A1* | 9/2011 | Oyobe | G02F 1/13338 345/175 |
| 2011/0317048 A1* | 12/2011 | Bai | H01L 27/1461 348/294 |
| 2014/0091857 A1* | 4/2014 | Bernstein | H01H 13/14 327/517 |
| 2015/0177909 A1* | 6/2015 | Hoffman | G06F 3/042 345/175 |

* cited by examiner

TOUCH DEVICE

CROSS-REFERENCE TO RELATED APPLICATION

This application claims the benefit of Chinese Patent Application No. 201810132726.9 filed on Feb. 9, 2018 in the State Intellectual Property Office of China, the whole disclosure of which is incorporated herein by reference.

FIELD OF THE DISCLOSURE

The present application relates to the field of touch technologies, and in particular, to a touch device.

DESCRIPTION OF THE RELATED ART

Input devices in related art, such as commonly used keyboards, are mainly classified into mechanical keyboards and capacitive type touch keyboards. Mechanical keyboards are commonly used in desktops in which a track straight-sliding figuration is employed. Capacitive touch keyboards are commonly used in laptop computers in which a capacitive touch input way is employed.

SUMMARY

In one aspect of the present invention, there is provided a touch device comprising an elastic material layer, a photosensitive layer and a touch layer disposed in sequence, wherein a key region is disposed in the touch layer, at least one deformable pad is disposed in the elastic material layer and each of the at least one deformable pad has a plurality of deformable blocks, some or all of the deformable blocks of the deformable pad are deformed so as to vary lights incident on the photosensitive layer in response to a corresponding position of the touch layer being subjected to a pressing operation, and an electrical signal at a position of the photosensitive layer corresponds to the pressing operation changes in response to the photosensitive layer sensing a change in lights.

In an embodiment, the at least one deformable pad is disposed at position(s) in one-to-one correspondence with orthographic projections of keys in the key region on the elastic material layer and, in response to the pressing operation applied onto a key in the key region, some or all of the deformable blocks of the deformable pad disposed at a position of the orthographic projection of the key in the elastic material layer are deformed.

In an embodiment, the deformable block comprises a slit, and the slit becomes a through hole when being deformed such that intensity of light incident on the photosensitive layer through the through hole is changed.

In an embodiment, the deformable block comprises a through hole, and part or all of the through hole is blocked when being deformed such that intensity of light incident on the photosensitive layer through the through hole is changed.

In an embodiment, the touch device further comprises a processor connected to the photosensitive layer. The processor is configured to detect the electrical signal in the photosensitive layer, determine the key being pressed according to the position at which the electrical signal changes, and control the key to implement a corresponding function.

In an embodiment, the photosensitive layer comprises at least one photosensitive element, and the at least one photosensitive element is disposed at position(s) in one-to-one correspondence with orthographic projections of keys in the key region on the photosensitive layer. The processor is connected to each of the photosensitive elements. When each of the photosensitive elements senses changes among different intensity level of the light, the electrical signal of the photosensitive element creates a corresponding change in an electricity quantity level. The processor is further configured to control a key corresponding to the photosensitive element to implement a function corresponding to the electricity quantity level depending on the electricity quantity level at which an electrical signal of each of the photosensitive elements changes.

In an embodiment, in response to the pressing operation of different pressure level applied onto a key in the key region, a corresponding number of the deformable blocks of the deformable pad disposed at a position of the orthographic projection of the key in the elastic material layer are deformed. The pressure level comprises a first pressure level and a second pressure level, and the function of the key comprises a first function and a second function. The number of the deformable blocks in each of the deformable pads is in a first threshold range in response to the corresponding key being subjected to a pressing operation of the first pressure level, and the change in the corresponding electrical signal of the photosensitive element is in a range of a first electricity quantity level. The processor controls the key to implement the first function. The number of the deformable blocks in each of the deformable pads is in a second threshold range in response to the corresponding key being subjected to a pressing operation of the second pressure level, and the change in the corresponding electrical signal of the photosensitive element is in a range of a second electricity quantity level. The processor controls the key to implement the second function.

In an embodiment, the first function is a digital function and the second function is a symbol function.

In an embodiment, the deformable pad comprises n*m deformable blocks arrange in an array; where both n and m are positive integers greater than or equal to 2.

In an embodiment, n is equal to m in one and the same deformable pad.

In an embodiment, n or m are the same in all of the deformable pads.

In an embodiment, the touch layer comprises a transparent substrate and a film layer on which the key region is disposed.

In an embodiment, the touch device further comprises a light emitting layer disposed on a side of the elastic material layer away from the photosensitive layer, and the light emitting layer is configured to emit light to the photosensitive layer of the touch device.

In an embodiment, in response to the pressing operation of different pressure level applied onto a key in the key region, the deformable blocks of the deformable pad disposed at a position of the orthographic projection of the key in the elastic material layer are deformed by a corresponding deformation degree. The pressure level comprises a first pressure level and a second pressure level, and the function of the key comprises a first function and a second function. The deformation degree of the deformable blocks in each of the deformable pads is in a first threshold range in response to the corresponding key being subjected to a pressing operation of the first pressure level, and the change in the corresponding electrical signal of the photosensitive element is in a range of a first electricity quantity level. The processor controls the key to implement the first function. The deformation degree of the deformable blocks in each of the deformable pads is in a second threshold range in response to the corresponding key being subjected to a pressing operation of the second pressure level, and the change in the corresponding electrical signal of the photosensitive element is in a range of a second electricity quantity level. The processor controls the key to implement the second function.

DETAILED DESCRIPTION OF PREFERRED EMBODIMENTS

The embodiments of the present disclosure will be described in detail below with reference to the accompanying drawings in order to make objects, technical solutions and advantages of the present disclosure more clear. It should be noted that the features in the embodiments and the embodiments in the present application may be arbitrarily combined with each other if there is no technical conflict.

The following specific embodiments provided by the present disclosure may be combined with each other, and the same or similar concepts or processes may not be repeated in some embodiments.

Figure 1:
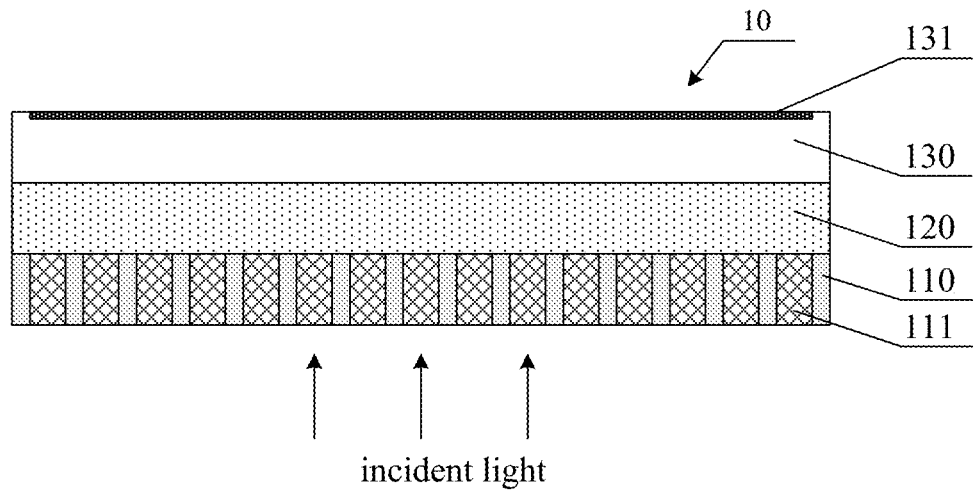
FIG. 1 is a schematic structural view of a touch device according to an embodiment of the present disclosure.

FIG. 1 is a schematic structural view of a touch device according to an embodiment of the present disclosure. The touch device 10 provided in this embodiment may include an elastic material layer 110, a photosensitive layer 120, and a touch layer 130 which are sequentially disposed in a light incident direction. A key region 131 of the touch device 10 is provided in the touch layer 130.

In the embodiment of the present disclosure, the touch layer 130 is an operation panel of the touch device 10. For example, in a condition that the touch device 10 is a touch keyboard, the key region 131 disposed in the touch layer 130 may be a relatively complete keyboard at present, which is in the form of keys on a traditional keyboard; or alternatively, it may also be a keyboard in which some functions are integrated, similar to a form of keys on a laptop keyboard.

Unlike the keyboard of the related/prior art, the key region 131 in the touch layer 130 of the embodiment of the present disclosure has non-mechanical keys.

In an implementation manner of the embodiment of the present disclosure, the touch layer 130 may have a multi-layer structure, for example, including a transparent substrate and a film layer on which the key region 131 is provided and a keyboard pattern is formed. The key region 131 may also be a thin film attached to a lower surface of the transparent substrate. If the touch device 10 in the embodiment of the present disclosure is a touch keyboard, the key region 131 may be, for example, a white-symbol-on-black-background pattern, or alternatively may be a keyboard pattern in other form(s). In another implementation manner of the embodiment of the present disclosure, the touch layer 130 may be a single layer structure in which the touch layer 130 may be, for example, a substrate of a metal material, and the key region 131 may be a concave-convex pattern formed on the touch layer 130 with a stamping process. A content of the key region 131 is, for example, a keyboard pattern, and the key region 131 in the touch layer 130 of the embodiment of the present disclosure is only used to identify the position and function of the keys.

The photosensitive layer 120 is configured to change an electrical signal at a position corresponding to a pressing operation when the photosensitive layer 120 senses changes in lights.

At least one deformable pad 111 is disposed in the elastic material layer 110. Each of the at least one deformable pad 111 is configured in a manner that a part or all of the deformable blocks of the at least one deformable pad 111 is deformed when the corresponding position of the touch layer 130 is subjected to a pressing operation, such that the light irradiated on the photosensitive layer 120 is changed.

In the touch device 10 provided by the embodiment of the present disclosure, structures for implementing optical touch are mainly the elastic material layer 110 and the photosensitive layer 120. The purpose of disposing the at least one deformable pad 111 in the elastic material layer 110 lies in that, when a user presses the key region 131 of the touch layer 130, one or some of the deformable pads 111 corresponding to the position being pressed may be subjected to a deformation, which may in turn change transmittance ratios of the lights on the photosensitive layer 120 at positions corresponding to these deformable pads 111. For example, if the deformation improves a light transmitting property of the deformable pad(s) 111, the intensity of the light incident on the photosensitive layer 120 through the deformable pad(s) 111 becomes stronger, or if the deformation improves a barrier property of the deformation structure 111, the intensity of the light incident on the photosensitive layer 120 through the deformable pad(s) 111 becomes weaker.

The photosensitive layer 120 in the embodiment of the present disclosure may be provided with photosensitive devices for sensing the illumination of the lights incident onto the photosensitive layer 120 through the deformable pad(s) 111. The photosensitive devices are, for example, an electrode material, or may alternatively be photosensitive components such as diodes and the like. When the light irradiated on one of the photosensitive devices at a certain position of the photosensitive layer 120 is changed, the photosensitive device at the position will generate a photo-electric effect, and the position is just a position corresponding to the pressing operation operated by the user, and therefore, the electrical signal in the photosensitive layer 120 at the position corresponding to the pressing operation is changed. In this way, an integrated circuit (abbreviated as IC) chip of the touch device 10 detects that the electrical signal at a certain position in the photosensitive layer 120 is changed, and then detects that the corresponding position in the key region 131 of the touch layer 130 is pressed, thereby the processing flow of the touch device 10 being realized.

It should be noted that, in the embodiment of the present disclosure, the elastic material layer 110 is typically made of a light shielding material (that is, the elastic material layer 110 itself has a complete barrier property) while the at least one deformable pad 111 disposed in the elastic material layer 110 may have the barrier property or may have the light transmitting property. When the at least one deformable pad 111 is pressed, the barrier property or the light transmitting property at present will become stronger or weaker. Therefore, the lights irradiated to the corresponding position of the photosensitive layer 120 through the deformable pad 111 are changed. In addition, at least one deformable pad 111 is disposed in the elastic material layer 110 of the embodiment of the present disclosure, a plurality of deformable blocks may be disposed in each of the deformable pads 111, or a plurality of deformable pads 111 may be provided individually (as shown in FIG. 1, the touch device shown as an example includes a plurality of deformable pads 111). When the touch device in the embodiment of the present disclosure includes two or more deformable pads, it is not limited that each of deformable pads has completely the same structures; instead, they may be provided with a same structure or different structures. And a specific number of the deformable blocks in each of the deformable pad which are deformed may not be limited either when each of the deformable pad 111 is deformed; in other words, the deformable blocks in each of the deformable pad which are deformed may be all or a part of the deformable blocks 111. With the above arrangements, the deformable pads are in one-to-one correspondence with keys in the key region; at the same time, for any pair of corresponding pad and key, depending on different pressure levels applied to the key, different number of deformable blocks in the deformable pad is deformed so that the key may perform different functions.

The mechanical keyboard of the electronic product of the related/prior art has no essential changes compared with a like product produced a few years ago, either in appearance or applied technology thereof. The mechanical keyboard has drawbacks such as heaviness and relatively large thickness thereof, relatively large noise during input, a relatively weak abrasive resistance, a relatively high failure rate and a relatively poor quality. New requirements for the performance and aesthetics of the keyboard are put forward with an increase in user's requirements. Updated capacitive touch keyboard remedies the above-mentioned drawbacks of the mechanical keyboard, but it is complex in both process and structure thereof and it is costly. As to the touch device 10 provided by the embodiment of the present disclosure, an overall thickness of the keyboard is thin, and the thickness may be controlled at 2 to 3 millimeters (mm). The optical touch has a good hand feeling, and the operation may be realized merely by pressing the touch layer 130. Therefore, there may be a small noise and a low wear rate when the input is implemented. Since the touch device 10 in the embodiment of the present disclosure realizes optical touch by utilizing a principle of light sensing, then it may be simple in both its structure for implementing optical touch and its manufacturing process, with a relatively low cost, facilitates a product with high quality.

The touch device provided by the embodiment of the present disclosure includes an elastic material layer, a photosensitive layer and a touch layer which are sequentially disposed in a light incident direction. A key region of the touch device is disposed in the touch layer. At least one deformable pad, each of which has a plurality of deformable blocks, is disposed in the elastic material layer. Each of the at least one deformable pad is configured such that some or all of the deformable blocks of the deformable pad are deformed so as to vary lights incident on the photosensitive layer when a corresponding position of the touch layer is subjected to a pressing operation. The photosensitive layer senses a change in an electrical signal at a position of the photosensitive layer corresponding to the pressing operation when the photosensitive layer senses a change in lights, and then the pressed key in the key region at the position at which the electric signal is changed is detected, thereby implementing the optical touch operation of the touch device. The touch device provided by the embodiment of the present disclosure realizes optical touch by using the photosensitive principle and has advantages such as an overall slimness, a relatively low input noise, a relatively low wear rate, and a relatively high quality and the like. The device also solves problems of relatively complicated structure and process and a relatively high cost of the capacitive touch keyboard in related art.

Optionally, in the touch device 10 provided by the embodiment of the present disclosure, at least one deformable pad 111 is disposed at position(s) in one-to-one correspondence with the orthographic projection of at least one key in the key region 131 on the elastic material layer 110.

Each of the deformable pads 111 is also configured such that some or all of the deformable blocks therein are deformed, when the key, whose orthographic projection is in correspondence with the deformable pad 111, is subjected to a pressing operation.

Figure 2:
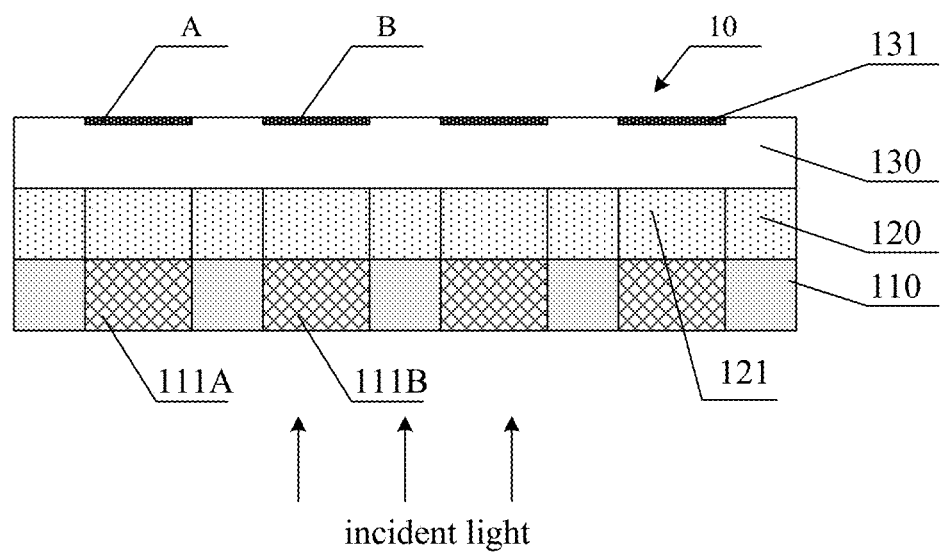
FIG. 2 is a schematic view showing a positional relationship between a deformable pad and keys in the touch device according to an embodiment of the present disclosure.

In the embodiment of the present disclosure, the number of the deformable pads 111 may be the same as the number of the keys in the key region 131, and each of the deformable pads 111 is provided corresponding to one key. Specifically, each of the deformable pads 111 is disposed at the orthographic projection of the corresponding key on the elastic material layer 110. FIG. 2 is a schematic view showing a positional relationship between deformable pads and keys in the touch device provided by the embodiment of the present disclosure. It may be seen that the elastic material layer 110 is used as a projection plane, and a deformable pad 111A is provided directly below a key 'A' (i.e., at the position of the orthographic projection of the key 'A'). Similarly, a deformable pad 111B is provided directly below the key 'B' (i.e., at the position of the orthographic projection of the key 'B'). Other keys and their corresponding deformable pads are arranged in the same manner. FIG. 2 only schematically shows a positional relationship between the deformable pads and the keys, which does not represent actual contents and specific number of keys in the key region 131.

Figure 3:
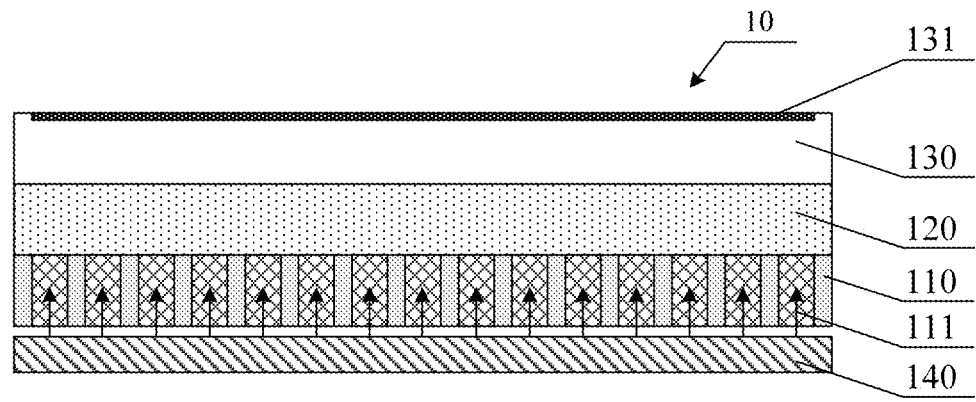
FIG. 3 is a schematic structural view of another touch device according to an embodiment of the present disclosure.

In an optional embodiment, FIG. 3 is a schematic structural view of another touch device according to an embodiment of the present disclosure. On a basis of the embodiment shown in FIG. 1, the touch device in the embodiment of the present disclosure further includes a light emitting layer 140 disposed on a side of the elastic material layer 110 away from the photosensitive layer 120, and the light emitting layer 140 is configured to emit light to the photosensitive layer 130 of the touch device 10.

In the embodiment of the present disclosure, the light emitting layer 140 is used as a light source device, which may be an illuminator or light emitter. For example, the light source device can be a light emitting diode (abbreviated as LED) and a light guide plate. The light emitting layer 140 is disposed to provide a stable light source. Reliability of the optical touch may be ensured when the light source is stable.

It has been explained in the above embodiments that the deformable pad 111 may be light shielding or light transmitting, which is further explained below through some specific examples.

Figure 4:
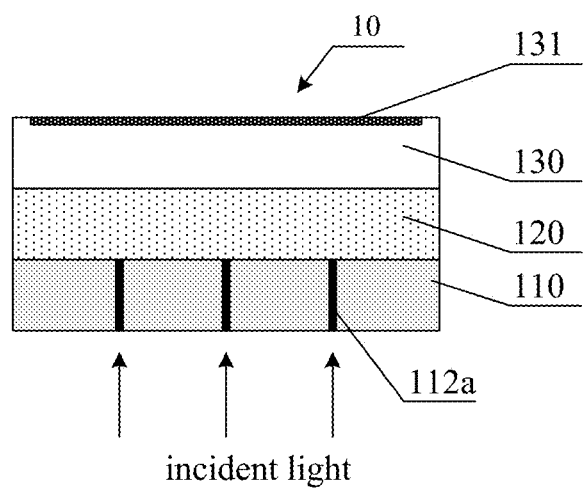
FIG. 4 is a schematic view of a deformable pad in a touch device according to an embodiment of the present disclosure in which the deformable pad includes slits and is not deformed.
Figure 5:
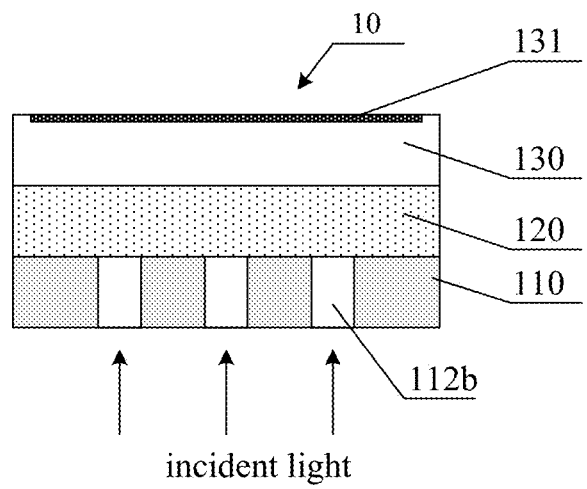
FIG. 5 is a schematic view of another deformable pad in a touch device according to an embodiment of the present disclosure in which the another deformable pad includes through holes and is not deformed.

In an implementation manner of the embodiment of the present disclosure, the deformable pad includes a slit 112a as shown in FIG. 4. The slit 112a is configured to be deformed to change into a through hole 112b (as shown in FIG. 5) when a corresponding position on the touch layer 130 is subjected to a pressing operation such that the intensity of lights incident on the photosensitive layer 120 through the through hole 112b is changed.

The photosensitive layer 120 is configured to change the electrical signal at a position corresponding to the pressing operation when the photosensitive layer 120 senses a change in the intensity of lights.

FIG. 4 is a schematic view of a deformable pad of a touch device according to an embodiment of the present disclosure. FIG. 5 is a schematic view of another deformable pad of the touch device according to an embodiment of the present disclosure. The light-emitting layer 140 is not shown in FIG. 4 and FIG. 5, only the light emitted from the light-emitting layer 140 is shown, and only three deformable blocks (i.e., the slit 112a and the through-hole 112b) in the deformable pad 111 are schematically shown. Referring to the deformable pad shown in FIG. 4, the deformable pad includes slits 112a. These slits 112a have a relatively poor light transmitting property before being deformed, and thus have a barrier property. Therefore, in a state where the touch layer 130 is not pressed (that is, when the slits 112a in a deformable pad are not deformed), the irradiation of the light that may be received on the photosensitive layer 120 is very weak. When the key corresponding to some slits 112a is pressed, these slits 112a are deformed by the pressing. The number of the slits 112a deformed into the through holes 112b may vary according to different pressing force applied thereon. In this condition, the barrier property of the deformable pad is deteriorated, and the intensity of the lights incident on the photosensitive layer 120 through the deformable pad becomes stronger. Accordingly, when the photosensitive layer 120 senses a change in the intensity of the lights, the electrical signal is also changed correspondingly at a position where the intensity of the lights changes, such a position being a position at which the key is subjected to the pressing operation.

It should be noted that, in the embodiment of the present disclosure, a specific structure is adopted in which the deformable pad includes the slits 112a, and a certain gap may be disposed between the elastic material layer 110 and the light emitting layer 140. The elastic material layer 110 is relatively thin, and walls of the slit 112a are extruded to bulge by pressing applied thereon, thereby causing an increase in surface area (slits are opened and become through holes 112b).

As shown in FIG. 5, in another implementation manner of the embodiment of the present disclosure, the deformable pad includes a through hole 112b. The through hole 112b is configured to block part or all of the through holes 112b when the touch layer 130 is pressed at the corresponding position thereof such that the light intensity of the lights incident on the photosensitive layer 120 is changed.

The photosensitive layer 120 is configured to change the electrical signal at a position corresponding to the pressing operation when the photosensitive layer 120 senses a change in the intensity of lights.

Figures 6A, 6B:
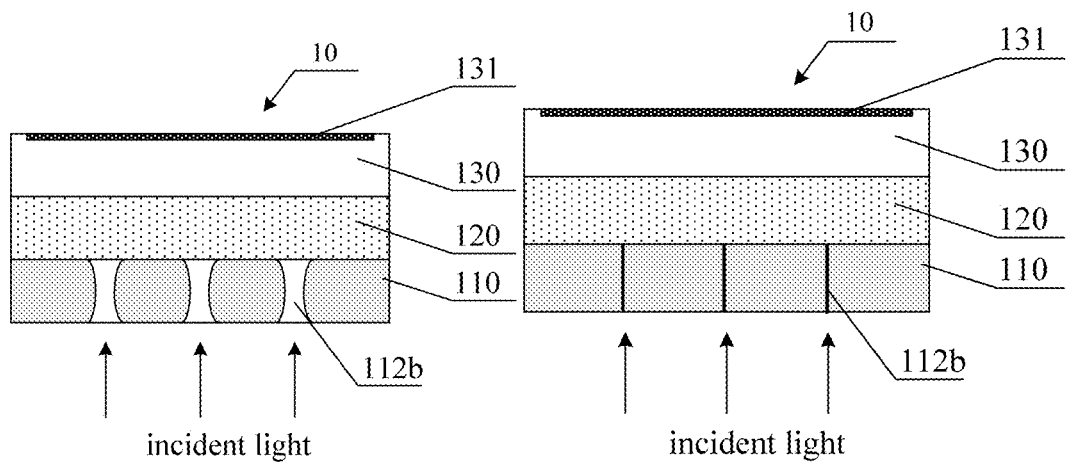
FIG. 6a and FIG. 6b are schematic views of the another deformable pad in the touch device according to an embodiment of the present disclosure in which the another deformable pad is deformed.

FIG. 5 is a schematic view of a deformable pad in a touch device according to an embodiment of the present disclosure, in which the deformable pad includes through holes and is not deformed. Referring also to the deformable pad shown in FIG. 6a and FIG. 6b, in the present embodiment, FIG. 6a is a schematic view of the deformable pad shown in FIG. 5 during the deformation, and FIG. 6b is another schematic view of the deformable pad shown in FIG. 5 during the deformation. As shown in FIG. 5, the deformable pad in this embodiment includes through holes 112b. These through holes 112b have a light transmitting property which is relatively good before deformation, and the lights may effectively pass through the through holes 112b. At this time, all the through holes 112b are regular holes and have a uniform diameter. Therefore, when the touch layer 130 is not pressed (that is, when the through holes 112b in the deformable pad are not deformed), the intensity of the lights that may be received by the photosensitive layer 120 is relatively strong. When the key corresponding to some through holes 112b are pressed, these through holes 112b are deformed by pressing applied thereon, and side walls of the through holes 112b gradually press the through holes 112b such that the through holes 112b are deformed and become smaller in diameter by pressing (as shown in FIG. 6a). Finally, the through holes 112b are blocked by deformation (as shown in FIG. 6b), and the number of the through holes 112b which are blocked by the deformation may vary according to different pressing forces. At this time, the light transmitting property of the deformable pad is deteriorated and the intensity of the lights incident on the photosensitive layer 120 through the deformable pad becomes stronger. Accordingly, when the photosensitive layer 120 senses a change in the intensity of the lights, the electrical signal is also changed correspondingly at a position where the intensity of the lights changes, such a position being the position at which the key is subjected to the pressing operation.

It should be noted that, in the embodiment of the present disclosure, a specific structure is adopted in which the deformable pad includes the through holes 112b, and a certain through hole 112b or some of the through holes 112b in the elastic material layer 110 are deformed by pressing applied thereon and the diameter of some of the through holes 112b becomes small. Some of the through holes 112b are deformed and changed into respective slits.

Figure 7:
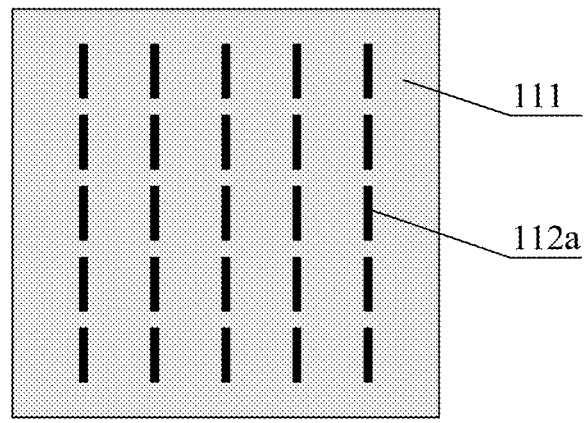
FIG. 7 is another schematic view of a deformable pad in the touch device according to an embodiment of the present disclosure.

Optionally, FIG. 7 is another schematic view of a deformable pad in the touch device according to an embodiment of the present disclosure. The deformable pad 111 in the embodiment of the present disclosure may include n*m deformable blocks arranged in an array. In the deformable pad 111 shown in FIG. 7, the deformable blocks are shown as the slits 112a for example, and the deformable pad 111 shown in FIG. 7 schematically shows an example structure including 5×5 slits 112a arranged in an array. The black short line as illustrated identifies the slits 112a. It should be noted that n and m are both positive integers. In the embodiments of the present disclosure, the number of n or m may be equal or unequal in different deformable pads, and the number of n and m in one and the same deformable pad may be equal or unequal.

In the embodiment of the present disclosure, if a plurality of deformable pads 111 are disposed in the elastic material layer 110, different deformable pads 111 are provided corresponding to different keys. Since different keys may be different in size thereof (for example, 'letter/alphabet' keys are generally squares which are uniform in size, some other keys, such as the 'space' key and the 'Enter' key are rectangles of different shapes), the number and form of the deformable blocks in the deformable pads 111 corresponding to the keys of different shapes may be set to be different. For the keys of the same shape, such as the 'letter/alphabet' keys, number and form of the deformable blocks in the deformable pad 111 corresponding to the keys of the same shape may be set to be the same. In addition, the values of n and m in the deformable pad 111 corresponding to the square keys (e.g., 'letter/alphabet' keys) may generally be set to be the same, while the values of n and m in the deformable pad 111 corresponding to the keys of rectangle or other shape may be set to be different. FIG. 7 is shown by taking the same number of n and m as an example.

Optionally, in the embodiment of the present disclosure, the touch device 10 may further include a processor 140 connected to the photosensitive layer 130. The processor 140 can be configured to detect an electrical signal in the photosensitive layer 120, to determine the pressed key according to the location where the electrical signal is changed, and to control the key to perform the corresponding function.

In the embodiment of the present disclosure, all of the elastic material layer 110, the light sensing layer 120 and the touch layer 130 are hardware structures of the touch device 10. The processor 140 has signal-processing capabilities, which may be for example an IC chip. The processor 140 can detect a change in the electrical signal at a certain position in the photosensitive layer 120 by processing the electrical signal in the light sensing layer 120. The process 140 can the detect that the corresponding key in the key region 131 of the touch layer 130 is pressed, and the touch device 10 will make corresponding feedbacks, thereby controlling the key to implement the corresponding function.

Further, in the embodiment of the present disclosure, each of the deformable pads 111 is further configured such that a number of deformable blocks of the deformable pad 111 corresponding to pressure levels are deformed when the keys corresponding to the deformable pad 111 are subjected to pressing operations of different pressure levels and the lights incident on the photosensitive layer 120 have a corresponding change in the intensity level of the lights.

Figure 8:
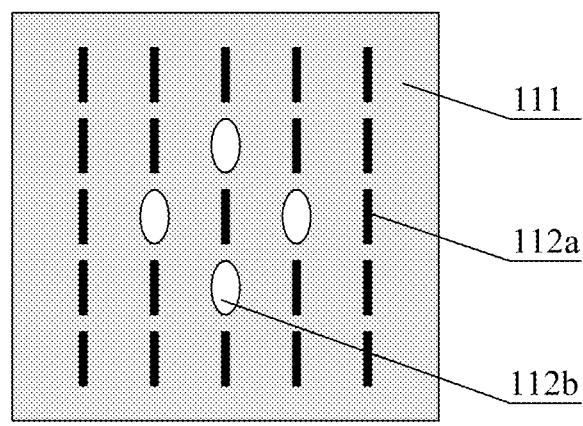
FIG. 8 is a schematic view of a deformation state of the deformable pad shown in FIG. 7 after being pressed.
Figure 9:
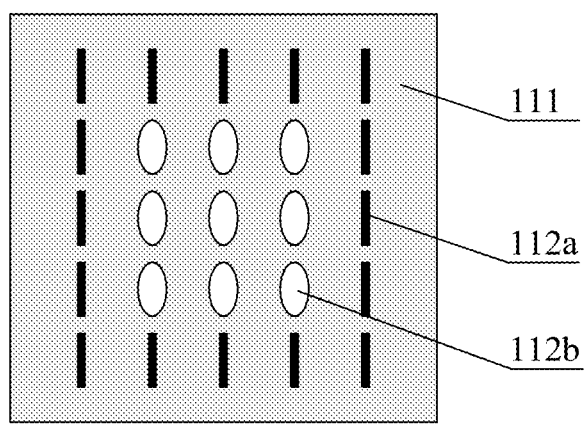
FIG. 9 is a schematic view of another deformation state of the deformable pad shown in FIG. 7 after being pressed.

Referring to the deformable pad shown in FIG. 7, which is also shown by taking a case as an example in which the deformable pad 111 includes slits 112a and these slits 112a are arranged in a 5×5 array. FIG. 7 shows a state of the deformable pad 111 when it is not deformed. FIG. 8 is a schematic view showing a deformed state of the deformed structure shown in FIG. 7 after being subjected to a press, and FIG. 9 is a schematic view showing another deformed state of the deformed structure shown in FIG. 7 after being subjected to a different press. The elliptical shapes shown in FIGS. 8 and 9 are the through holes 112b formed by the slits 112a when they are deformed. Referring to the deformable pad 111 shown in FIGS. 7 through 9, since the deformable pad 111 in the embodiment of the present disclosure includes a plurality of deformable blocks (the slits 112a in FIG. 7), the intensity of the lights incident on the photosensitive layer 120 is changed by deformation of the deformable blocks, thereby achieving an optical touch. In practical applications, as the strength of the user pressing the keys varies, the amount of the deformable blocks (the slits 112a in FIG. 7) in the deformable pad 111 which are deformed also varies accordingly. On basis of the manner in which the deformable pad is provided, it is possible to set a multi-level pressure sensing operations to the touch device 10.

Optionally, as shown in FIG. 2, in the embodiment of the present disclosure, the photosensitive layer 120 includes at least one photosensitive element 121, and the at least one photosensitive element 121 is disposed at position(s) in one-to-one correspondence with the orthographic projection(s) of the at least one key in the key region on the photosensitive layer 120. The processor 140 is connected to each of the photosensitive elements 121.

Each of the photosensitive elements 121 is configured to have a corresponding change in electricity quantity level of the electrical signal thereof when it senses different changes in the intensity level of the lights.

The processor 140 is further configured to control the key corresponding to the photosensitive elements 121 to implement a function corresponding to the electricity quantity level according to the electricity quantity level changed in the electrical signal of each of the photosensitive elements 121.

In the embodiment of the present disclosure, the arrangement of the photosensitive elements 121 in the photosensitive layer 120 is similar to that of the deformable pad 111, and may be in a one-to-one correspondence with the keys in the key region 131. For the photosensitive element 121, the photosensitive layer 120 serves as a projection plane. Each of the photosensitive elements 121 is specifically disposed at a position of the orthographic projection of the corresponding key on the photosensitive layer 120. The photosensitive element 121 may be an electrode material as described in the above embodiments, or may be a photosensitive device such as a diode. The processor 140 may be connected to each of the photosensitive elements 121, may detect a change in the electrical signal of each of the photosensitive elements 121, and then may identify the corresponding key. In addition, since the pressure level may vary when the key is pressed, the lights incident on the photosensitive elements 121 may have different intensity levels which are ever-changing, and the electrical signal in the photosensitive elements 121 may also have different electricity quantity levels which are ever-changing. Based on the above implementation principle, it is possible to configure a plurality of functions for one key. The number of functions of the key may be set corresponding to the number of pressure levels applied on the key (that is, each pressure level is set corresponding to a function of the key). As such, a plurality of functions of the keyboard in related art may be integrated in fewer keys, thereby improving integration degree of the keyboard, and a random switching function of the keys may be achieved within the entire key region of the touch device 10 by pressing operations of different pressure levels.

In practical applications, for example, two pressure levels may be set for the touch device 10, including a first pressure level and a second pressure level. The functions of the keys generally include digital functions and symbol functions; thus, each of the deformable pads 111 is configured such that, when the key corresponding thereto is subjected to a pressing operation of the first pressure level, the number of deformable blocks that are deformed is within a first threshold range, the electrical signal of the photosensitive element changes within a range of a first electricity quantity level, and the processor controls the keys to implement the digital function. When the key corresponding thereto is subjected to a pressing operation of the second pressure level, the number of deformable blocks that are deformed is within a second threshold range, the electrical signal of the photosensitive element changes within a range of a second electricity quantity level, and the processor 140 controls the keys to implement the symbol function. As discussed below, it is described with a specific example that different pressure levels are set for the touch device 10 in the embodiments of the present disclosure and a way to implement different functions of a key with different pressure levels.

For example, a two-level pressure sensing operation is set for the touch device 10, the first pressure level is a light pressure, the second pressure level is a heavy pressure. Taking one key as an example, and functions of the selected key are "7" and "&" (that is, the two functions share one key). Also referring to the various states of the deformable pad 111 shown in FIGS. 7-9, it is described by taking the case in which the deformable pad 111 includes the slit 112a as an example. When the key is not pressed, all of the slits 112a in the deformable pad 111 are closed (as shown in FIG. 7). At this time, the key does not perform any function. When the key is pressed with a light pressure (i.e., the first pressure level), the number of the slits 112a which become the through hole 112b is greater than or equal to 4 and is less than 9 (as shown in FIG. 8). At this time, the electrical signal of the corresponding photosensitive element in the photosensitive layer 120 changes within a range of the first electricity quantity level, and the processor 140 processes such an electrical signal and the key is presented as the function key "7". When the key is pressed with a heavy pressure (i.e., the second pressure level), the number of the slits 112a which become the through holes 112b is greater than or equal to 9 and is less than or equal to 25 (as shown in FIG. 9). At this time, the electrical signal of the corresponding photosensitive element in the photosensitive layer 120 changes within a range of the second electricity quantity level, and the processor 140 processes such an electrical signal and the key is presented as the function key "&". Therefore, a two-level pressure sensing operation and the function of switching the keys freely in the full key region range of the touch device are realized.

It should be noted that the embodiments of the present disclosure does not limit the touch device 10 only to an operation of two pressure levels. An operation of three or four pressure levels (or more) may be achieved. The more the levels of the pressure are, the higher the integration degree of the keyboard is. For example, if it is required to achieve pressure sensing operations with three or more pressure levels, a grading as a function of the number of the deformable blocks which are deformed when being pressed is sufficient. For example, it is defined that an operation of zero pressure level is adopted in a condition that the number of the deformable blocks which are deformed is 0; an operation of a single pressure level is adopted in a condition that the number of the deformable blocks which are deformed is greater than 0 and less than 4; an operation of two pressure levels is adopted in a condition that the number of the deformable blocks which are deformed is greater than or equal to 4 and less than 9; and an operation of three pressure levels is adopted in a condition that the number of the deformable blocks which are deformed is greater than or equal to 9 and less than 25. If more levels of pressure are to be achieved, it is possible to provide more deformable blocks in each deformable pad 111 and to implement grading the deformable blocks reasonably.

It should also be noted that, in addition to the fact that the pressure can be leveled according to the number of deformable blocks that are deformed upon pressing, it is also conceivable to level the pressure according to a deformation degree of the deformable block upon pressing. The specific leveling method is as follows:

For example, a two-level pressure sensing operation is set for the touch device 10: the first pressure level is a light pressure and the second pressure level is a heavy pressure. Taking one key as an example, and functions of the selected key are "7" and "&" (that is, the two functions share one key). Also referring to the various states of the deformable pad 111 shown in FIGS. 5, 6a and 6b, it is described by taking the case in which the deformable pad 111 includes the through hole 112b as an example. When the key is not pressed, portions between the through holes 112b are not deformed (as shown in FIG. 5). At this time, the key does not perform any function. When the key is pressed with a light pressure (i.e., the first pressure level), the portions between the through holes 112b are deformed by pressing such that the through holes 112b are decreased while these through holes are not closed (as shown in FIG. 6a). At this time, the electrical signal of the corresponding photosensitive element in the photosensitive layer 120 changes within a range of the first electricity quantity level, and the processor 140 processes such an electrical signal and the key is presented as the function key "7". When the key is pressed with a heavy pressure (i.e., the second pressure level), the portions between the through holes 112b are deformed by pressing such that the through holes 112b are closed (as shown in FIG. 6b). At this time, the electrical signal of the corresponding photosensitive element in the photosensitive layer 120 changes within a range of the second electricity quantity level, and the processor 140 processes such an electrical signal and the key is presented as the function key "&". Therefore, a two-level pressure sensing operation and the function of switching the keys freely in the full key region range of the touch device are realized.

It should be noted that the embodiments of the present disclosure does not limit the touch device 10 to only an operation of two pressure levels. An operation of three or four pressure levels (or more) may be achieved. The more the levels of the pressure are, the higher the integration degree of the keyboard is. For example, if it is required to achieve pressure sensing operations with three or more pressure levels, a grading as a function of the deformation degree of the deformable blocks which are deformed when being pressed is sufficient.

The touch device provided by the embodiment of the present disclosure forms a hardware structure of the keyboard with the elastic material layer, the photosensitive layer and the touch layer is simple in structure, simple in manufacturing process, and low in cost. On the basis of optical sensing based on the photosensitive principle, according to the hardware foundation of the deformable pad and the change mount of the intensity of the lights incident on the photosensitive layer, a multi-level pressing operation is provided to the touch device and the key-switching functions may be achieved freely within the entire key region of the touch device 10, thereby improving the integration degree of the keys.

The embodiments of the present disclosure are described as above. However, they are merely used to facilitate understanding of the present disclosure and are not intended to limit the present disclosure. Any modification and variation in the form and details of the implementation may be made by those skilled in the art without departing from the spirit and scope of the disclosure. The protect scope of the present disclosure is defined by the appended claims.

What is claimed is:

1. A touch device comprising:
   an elastic material layer;
   a photosensitive layer;
   a touch layer, the elastic material layer, the photosensitive layer, and the touch layer being disposed in sequence, wherein a key region is disposed in the touch layer;
   at least one deformable pad disposed in the elastic material layer, each of the at least one deformable pad having a plurality of deformable blocks with some or all of the deformable blocks of the deformable pad being deformed so as to vary lights incident on the photosensitive layer in response to a corresponding position of the touch layer being subjected to a pressing operation; and
   an electrical signal at a position of the photosensitive layer corresponding to the pressing operation changes in response to the photosensitive layer sensing a change in lights;
   wherein:
   the deformable block comprises a slit and the slit becomes a through hole when being deformed such that intensity of light incident on the photosensitive layer through the through hole is changed, or
   the deformable block comprises a through hole and part or all of the through hole is blocked when being deformed such that intensity of light incident on the photosensitive layer through the through hole is changed.

2. The touch device according to claim 1, wherein the at least one deformable pad is disposed at a position in one-to-one correspondence with orthographic projections of keys in the key region on the elastic material layer and, in response to the pressing operation applied onto a key in the key region, some or all of the deformable blocks of the deformable pad disposed at a position of the orthographic projection of the key in the elastic material layer are deformed.

3. The touch device according to claim 1, wherein the touch device further comprises a processor connected to the photosensitive layer with the processor being configured to detect the electrical signal in the photosensitive layer, determine the key being pressed according to the position at which the electrical signal changes, and control the key to implement a corresponding function.

4. The touch device according to claim 3, wherein the photosensitive layer comprises at least one photosensitive element, the at least one photosensitive element being disposed at a position in one-to-one correspondence with orthographic projections of keys in the key region on the photosensitive layer, the processor being connected to each of the photosensitive elements and when each of the photosensitive elements senses changes among different intensity level of the light, the electrical signal of the photosensitive element creates a corresponding change in an electricity quantity level, the processor further being configured to control a key corresponding to the photosensitive element to implement a function corresponding to the electricity quantity level depending on the electricity quantity level at which an electrical signal of each of the photosensitive elements changes.

5. The touch device according to claim 4, wherein, in response to the pressing operation of different pressure level applied onto a key in the key region, a corresponding number of the deformable blocks of the deformable pad disposed at a position of the orthographic projection of the key in the elastic material layer are deformed, and wherein the pressure level comprises a first pressure level and a second pressure level, and the function of the key comprises a first function and a second function;
   the number of the deformable blocks in each of the deformable pads is in a first threshold range in response to the corresponding key being subjected to a pressing operation of the first pressure level, and the change in the corresponding electrical signal of the photosensitive element is in a range of a first electricity quantity level, the processor controls the key to implement the first function;
   the number of the deformable blocks in each of the deformable pads is in a second threshold range in response to the corresponding key being subjected to a pressing operation of the second pressure level, and the change in the corresponding electrical signal of the photosensitive element is in a range of a second electricity quantity level, the processor controls the key to implement the second function.

6. The touch device according to claim 5, wherein the first function is a digital function and the second function is a symbol function.

7. The touch device according to claim 4, wherein, in response to the pressing operation of different pressure level applied onto a key in the key region, the deformable blocks of the deformable pad disposed at a position of the orthographic projection of the key in the elastic material layer are deformed by a corresponding deformation degree, and wherein the pressure level comprises a first pressure level and a second pressure level, and the function of the key comprises a first function and a second function;
   the deformation degree of the deformable blocks in each of the deformable pads is in a first threshold range in response to the corresponding key being subjected to a pressing operation of the first pressure level, and the change in the corresponding electrical signal of the photosensitive element is in a range of a first electricity quantity level, the processor controls the key to implement the first function;
   the deformation degree of the deformable blocks in each of the deformable pads is in a second threshold range in response to the corresponding key being subjected to a pressing operation of the second pressure level, and the change in the corresponding electrical signal of the photosensitive element is in a range of a second electricity quantity level, the processor controls the key to implement the second function.

8. The touch device according to claim 1, wherein the deformable pad comprises n*m deformable blocks arrange in an array where both n and m are positive integers greater than or equal to 2.

9. The touch device according to claim 8, wherein n is equal to m in one and the same deformable pad.

10. The touch device according to claim 8, wherein n or m are the same in all of the deformable pads.

11. The touch device according to claim 1, wherein the touch layer comprises a transparent substrate and a film layer on which the key region is disposed.

12. The touch device according to claim 1, further comprising a light emitting layer disposed on a side of the elastic material layer away from the photosensitive layer, the light emitting layer being configured to emit light to the photosensitive layer of the touch device.

* * * * *